United States Patent [19]
Soliman et al.

[11] Patent Number: 6,081,229
[45] Date of Patent: Jun. 27, 2000

[54] SYSTEM AND METHOD FOR DETERMINING THE POSITION OF A WIRELESS CDMA TRANSCEIVER

[75] Inventors: Samir S. Soliman, San Diego, Calif.; Klein S. Gilhousen, Bozeman, Mont.

[73] Assignee: Qualcomm Incorporated, San Diego, Calif.

[21] Appl. No.: 09/040,501

[22] Filed: Mar. 17, 1998

[51] Int. Cl.⁷ .............................. G01S 5/02; H04B 7/185
[52] U.S. Cl. .............................. 342/357.05; 342/357.01; 342/357.06; 701/213
[58] Field of Search ........................ 342/357.01, 357.05, 342/357.06, 357.09, 357.1, 357.16; 701/213

[56] References Cited

U.S. PATENT DOCUMENTS

| | | | |
|---|---|---|---|
| 5,119,102 | 6/1992 | Barnard | 342/357 |
| 5,223,844 | 6/1993 | Mansell et al. | 342/357 |
| 5,414,432 | 5/1995 | Penny et al. | 342/357 |
| 5,600,706 | 2/1997 | Dunn et al. | 379/59 |
| 5,619,211 | 4/1997 | Horkin et al. | 342/357 |
| 5,742,233 | 4/1998 | Hoffman et al. | 340/573 |
| 5,872,539 | 2/1999 | Mullen | 342/357 |

*Primary Examiner*—Thomas H. Tarcza
*Assistant Examiner*—Dao L. Phan
*Attorney, Agent, or Firm*—R. Ben Miller; Bruce W. Greenhaus

[57] ABSTRACT

A system and method for determining a position of a mobile wireless transceiver. The inventive system merges GPS position location and wireless communication technologies to achieve a precise position location in dense urban and other environments when line-of-sight to the satellites is somewhat obscured. The inventive method uses signals from only two GPS satellites and the serving terrestrial base station. In a most general sense, the inventive method includes the steps of receiving at a base station a first signal transmitted from a first GPS satellite and a second signal transmitted from a second GPS satellite. The mobile transceiver is adapted to receive these GPS signals as well and transmit a third signal to the base station in response thereto. The base station receives the third signal and uses it to calculate the position of the wireless unit. In a specific implementation, the base station sends aiding information to the wireless unit. The aiding information is used by the wireless unit to quickly acquire the signals transmitted by the first and second satellites and includes satellite identification information, Doppler shift information, and range information between the base station and the satellites. On the acquisition by the wireless unit of the signals transmitted by the first and second satellites, the wireless unit wireless unit calculates the range between the wireless unit and each of the satellites. This range information is transmitted back to the base station along with information as to the time at which the measurement was made. In a CDMA implementation, the time at which the wireless unit transmits the third signal to the base station is known by the base station. The delay in the receipt of the third signal provides an indication to the base station as to the range between the base station and the wireless unit. The base station utilizes information known as to its position, the position of the first and second satellites relative to the wireless unit and the range to the wireless unit from the base station to calculate the position of the wireless unit.

21 Claims, 8 Drawing Sheets

SYSTEM AND METHOD FOR DETERMINING THE POSITION OF A WIRELESS CDMA TRANSCEIVER

BACKGROUND OF THE INVENTION

I. Field of the Invention

The present invention relates to communications systems. More specifically, the present invention relates to systems and techniques for locating the position of a wireless transmitter in a code division multiple access system.

II. Description of the Related Art

Deployment of location technologies in wireless networks is being driven by regulatory forces and carriers' desires to enhance revenues by differentiating service offering from those of competitors. In addition, in June 1996, the Federal Communications Commission (FCC) mandated support for enhanced emergency 911 (E-911) service. Phase I of the Order requires that sector and cell information be set back to the PSAP (Public Safety Answering Point) agency. Phase II of the Order requires that the location of the cellular transceiver be sent back to the PSAP. To comply with the FCC mandate, 77,000 total sites are to be equipped with automatic location technologies by the year 2005.

Many techniques are being considered to provide automatic location capability. One technique being considered involves measuring the time difference of arrival of signals from a number of cell sites. These signals are triangulated to extract location information. Unfortunately, this technique requires a high concentration of cell sites and/or an increase in the transmission power of the sites to be effective. This is due to the fact that in a typical CDMA system, each telephone transmits with only enough signal power to reach the closest cell site. As triangulation requires communication with at least three sites, the concentration of cell sites would have to be increased or the signal power of each wireless unit would have to be increased.

In any event, each alternative has significant drawbacks. An increase in the number of cell sites would be too costly. Increases in signal power would add to the weight and cost of each wireless unit and increase the likelihood of interference between wireless users. In addition, the triangulation approach does not appear to offer the accuracy required by the FCC mandate.

Another approach being considered involves the addition of GPS (Global Positioning System) functionality to the cellular telephone. Although, this approach would add significant cost and weight to the wireless unit, require a line-of-sight to four satellites, and would be somewhat slow, nevertheless, it is the most accurate approach to support location services.

To speed the process, a third approach sends aiding information to the wireless unit indicating where the wireless unit should look in frequency for GPS carriers. Most GPS receivers use what is known as a GPS satellite almanac to minimize a search performed by the receiver in the frequency domain for a signal from a visible satellite. The almanac is a 15,000 bit block of coarse ephemeris and time model data for the entire constellation. The information in the almanac regarding the position of the satellite and the current time of day is approximate only. Without an almanac, the GPS receiver must conduct the widest possible frequency search to acquire a satellite signal. Additional processing is required to attain additional information that will aid in acquiring other satellites.

The signal acquisition process can take several minutes due to the large number of frequency bins that need to be searched. Each frequency bin has a center frequency and predefined width. The availability of the almanac reduces the uncertainty in satellite Doppler and therefore the number of bins that must be searched.

The satellite almanac can be extracted from the GPS navigation message or sent on the down (forward) link as a data or signaling message to the receiver. On receipt of this information, the receiver performs GPS signal processing to determine its location. While this approach may be somewhat faster, it suffers from the requirement of a line-of-sight to at least four satellites. This may be problematic in urban environments.

Hence, a need remains in the art for a fast, accurate and in expensive system or technique for locating a cellular.

SUMMARY OF THE INVENTION

The need in the art is addressed by the system and method of the present invention for determining the position of a wireless transceiver. In the most general sense, the inventive method is a hybrid approach for determining position using ranging information from a terrestrial system, timing information from a wireless unit, and ranging information from GPS satellites. This information is combined to allow the position of a wireless unit to rapidly and reliably determined. The inventive method includes the steps of receiving at a wireless unit a first signal transmitted from a first GPS satellite a second signal transmitted from a second GPS satellite and a third signal form a third satellite. The wireless unit is adapted to receive these GPS signals as well and transmit a fourth signal to the base station in response there to. The base station receives the fourth signal, corrects for the clock bias imposed on the fourth signal by the round trip delay between the base station and the wireless unit and uses the unbiased fourth signal to calculate the position of the wireless unit.

In a specific implementation, the base station sends aiding information to the wireless unit. The aiding information is used by the wireless unit to quickly acquire the signals transmitted by the first, second and third satellites. The aiding signals are derived from information collected at the base station transceiver subsystem (BTS) serving the wireless unit and includes satellite identification information, Doppler shift information, and a values indicating the distance between the base station and each satellite, and a search window size associated with each satellite, the search window size being calculated based on the round trip delay between the wireless unit and the base station and the elevation angle of each satellite.

Upon acquisition by the wireless unit of the signals transmitted by the first, second and third satellites, the wireless unit calculates the range between the wireless unit and each of the satellites pm1, pm2, and pm3, respectively. This range information is transmitted back to the base station along with information as to the time at which the measurement was made. In a CDMA implementation, the time at which the wireless unit transmits the third signal to the base station is known by the base station. The delay in the receipt of the fourth signal indications to the base station the distance between the wireless unit and the base station. In addition, the delay provides a means for correcting the wireless unit absolute time.

A device external to the mobile device, such as the base station controller or some other entity associated with the cellular infrastructure utilizes information known to the serving base station, such as its position, the position of the first, second, and third satellites relative to the wireless unit and the distance between the wireless unit and base station to calculate the position of the wireless unit. This is achieved by finding an intersection of a first sphere of radius cp1 around a first satellite, a second sphere of radii cp2 around the second satellite, and a third sphere of radii cp3 around the third satellite, and a fourth sphere of radius cpb around the base station, where c is the speed of light, p1 is the pseudo-range associated with the first satellite and the wireless unit, p2 is the pseudo-range associated with the second satellite and the wireless unit and p3 is the pseudo-range associated with the third satellite and the wireless unit.

Note that if a line-of-sight (no multipath) exists between the wireless unit and the base station, then the proposed approach requires measurements from only two satellites and one base station. Additional information from another base station, if available, can be used to further reduce the number satellites. Also in situations, where only two-dimensional locations are needed, only two satellites and one base station are needed.

One key advantage of this approach over other known GPS approaches is the speed with which the wireless unit can determine the pseudo-range. Since the serving base station has its own GPS receiver, and also knows the pseudo-ranges of all satellites being tracked with respect to the serving base station location, it is possible to determine a search window center and search window size for each satellite being tracked. The information is sent to the wireless unit to increase the speed of the search process.

That is, a clock onboard each GPS satellite controls the timing of the broadcast of the ranging signal by the satellite. Each such clock is synchronized to GPS system time. The base station also contains a clock that is synchronized to GPS system time. The wireless unit synchronizes its clock to GPS time with a delay corresponding to the one-way delay between the base station and the wireless unit. Timing information is embedded within the satellite ranging signal that enables the wireless unit to calculate when the signal was transmitted from a specific satellite. By recording the time when the signal was received, the distance (range) from the satellite to the wireless unit can be computed. As a result, the locus of the location of the wireless unit is a sphere with center at the satellite location and radius equal to the calculated range. If a measurement is simultaneously made using the ranging of two other satellites, the wireless unit would be somewhere on the surface of three spheres. The three spheres intersects in two points, however, only one of the points is the correct wireless user position. The candidate locations are mirror images of one another with respect to the plane containing the three satellites.

In the best mode, the invention identifies at the base station, three best GPS satellites for locating the position of the wireless unit at a given point in time. This information is forwarded to the wireless unit to facilitate the search operation performed by the wireless unit.

In one embodiment, the wireless unit can have several modes of operation:
  (1) Hybrid mode using information from both the wireless system infrastructure and the GPS satellites;
  (2) Stand-alone (standard or conventional) GPS mode;
  (3) Aided stand-alone GPS mode;
  (4) Inverted differential GPS mode; and
  (5) Aided and inverted differential GPS mode.

DETAILED DESCRIPTION OF THE INVENTION

Illustrative embodiments will now be described with reference to the accompanying drawings.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope of the present invention and additional fields in which the present invention would be of significant utility.

Figure 1:
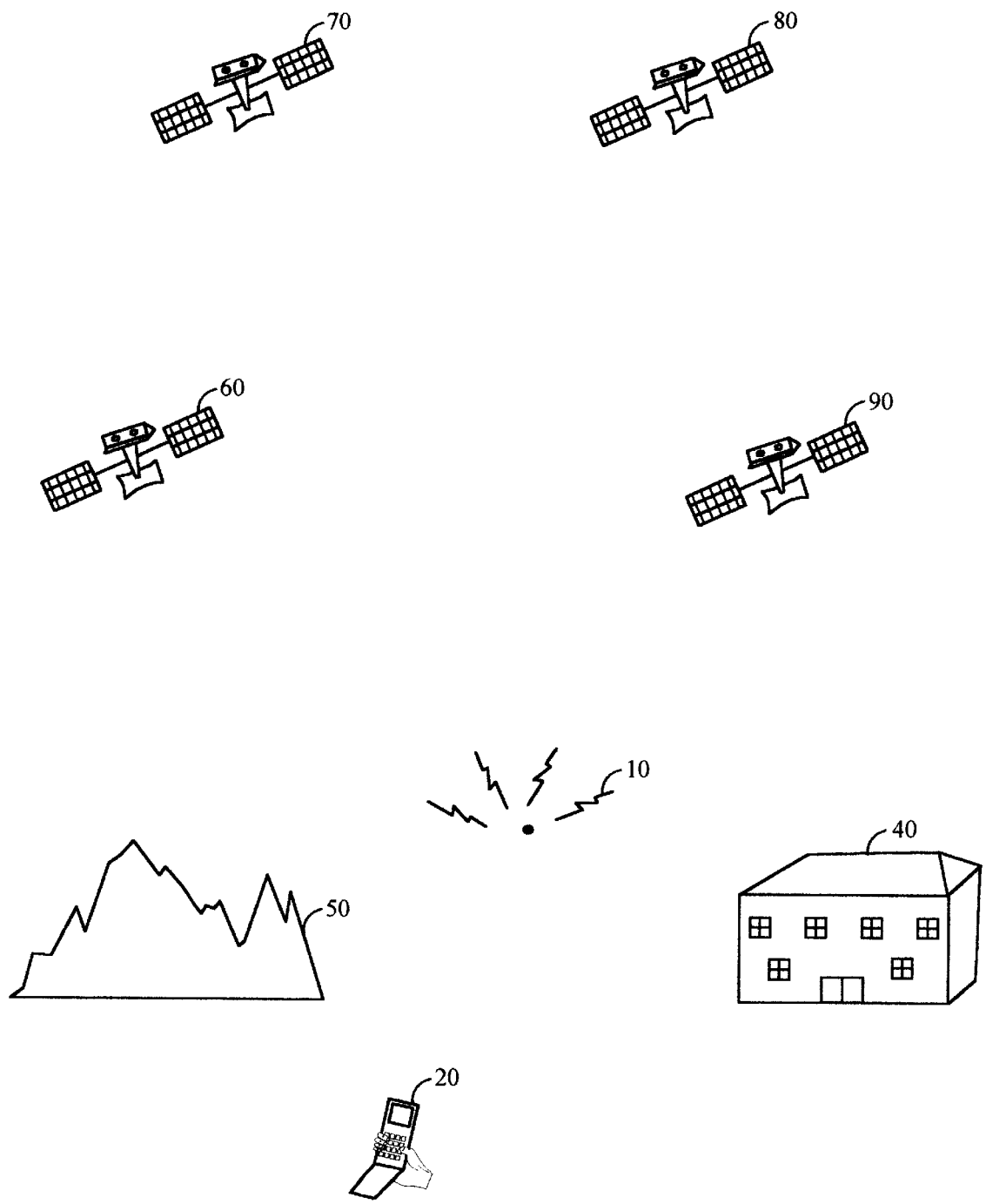
FIG. 1 is a diagram showing an illustrative implementation of a base station and wireless unit of a wireless (CDMA) communication system.

FIG. 1 is a diagram showing an illustrative implementation of a base station 10 and a wireless unit 20 of a wireless (CDMA) communication system. The communication system is surrounded by buildings 40 and ground based obstacles 50. The base station 10 and wireless unit 20 are disposed in a GPS (Global Positioning System) environment having several GPS satellites, of which four are shown 60, 70, 80 and 90. Such GPS environments are well known. See for example Hofmann-Wellenhof, B., et al., GPS Theory and Practice, Second Edition, New York, N.Y.: Springer-Verlag Wien, 1993. Those of ordinary skill in the art will appreciate that the present teachings may be applied to other communication systems, such as advanced mobile phone system (AMPS), Global system for mobile communications (GSM), etc. without departing from the scope of the present invention.

In a typical GPS application, at least four satellites are required in order for a GPS receiver to determine its position. In contrast, the present invention provides a method and apparatus for determining the position of a wireless unit 20 using only three GPS satellites, the round trip delay from the wireless unit to the serving base station 10, and the known location of the serving base station 10. In cases where there is a direct line-of-sight available, only two GPS satellites, round trip delay, and the known location of the serving base station 10 are required to locate a wireless unit 20.

Figure 2:
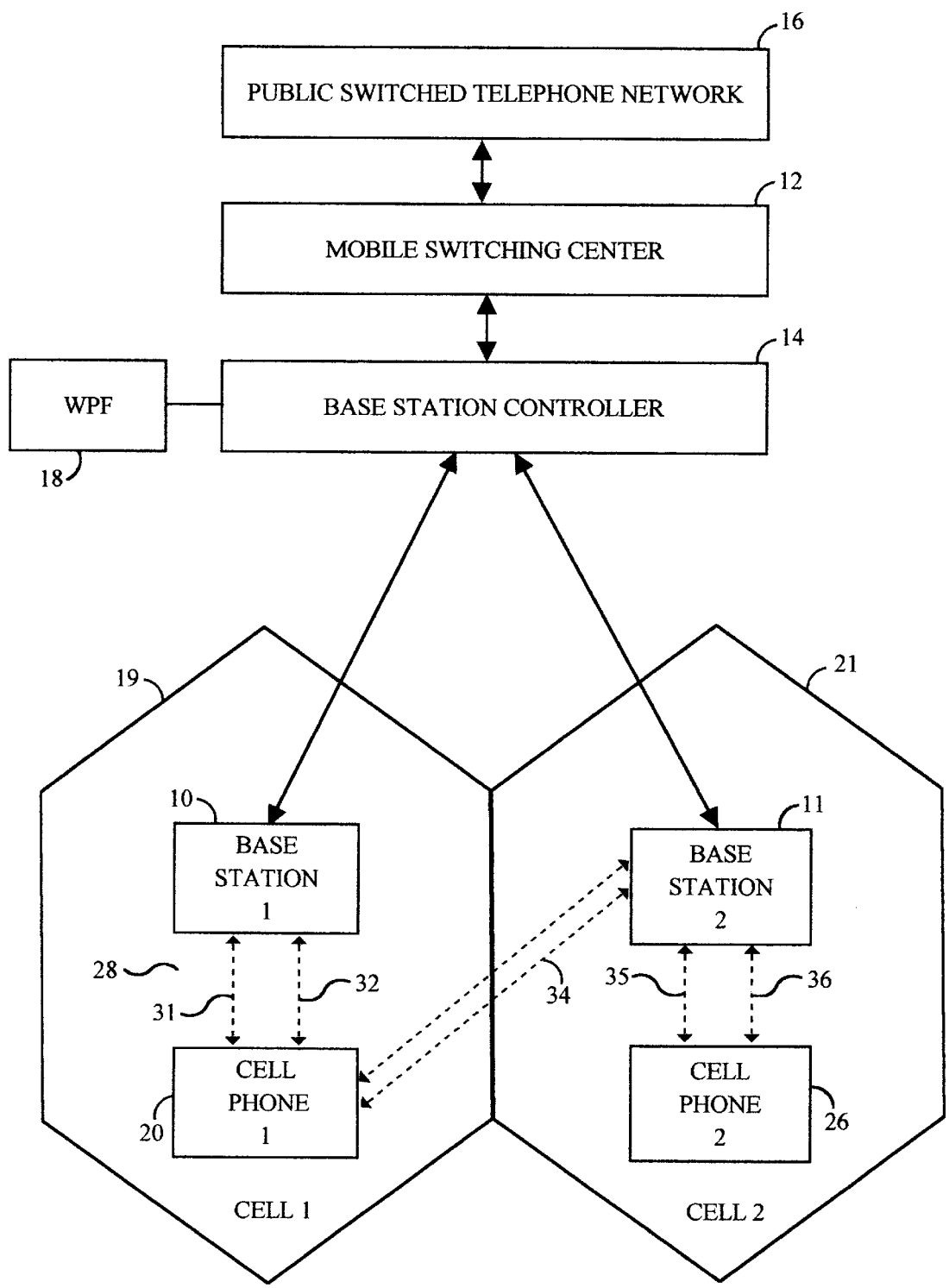
FIG. 2 is a block diagram of an exemplary CDMA cellular telephone system.

FIG. 2 is a block diagram of a CDMA cellular telephone system 30. The system 30 includes a mobile switching center (MSC) 12 having a base station controller (BSC) 14. A public switched telephone network (PSTN) 16 routes calls from telephone lines and other networks (not shown) to and from the MSC 12. The MSC 12 routes calls from the PSTN 16 to and from a source base station 10 associated with a first cell 19 and a target base station 11 associated with a second cell 21. In addition, the MSC 12 routes calls between the base stations 10, 11. The source base station 10 directs calls to the first wireless unit 20 within the first cell 19 via a first communications path 28. The communications path 28 is a two-way link having a forward link 31 and a reverse link 32. Typically, when the base station 10 has established voice communications with the wireless unit 20, the link 28 includes a traffic channel. Although each base station 10, 11 is associated with only one cell, a base station controller often governs or is associated with base stations in several cells.

When the wireless unit 20 moves from the first cell 19 to the second cell 21, the wireless unit 20 begins communicating with the base station associated with the second cell. This is commonly referred to as a "hand-off" to the target base station 11. In a "soft" handoff, the wireless unit 20 establishes a second communications link 34 with the target base station 11 in addition to the first communications link 28 with the source base station 10. After the wireless unit 20 crosses into the second cell 21 and the link with the second cell has been established, the wireless unit may drop the first communications link 28.

In a hard handoff, the operation of the source and target base stations typically are different enough that the communications link 34 between the source base station must be dropped before the link to the target base station can be established. For example, When a source base station is within a CDMA system using a first frequency band and target base station is in a second CDMA system using a second frequency band, the wireless unit will not be able to maintain links to both base stations concurrently, since most wireless units do not have the ability to tune to two different frequency bands concurrently. When the first wireless unit 20 moves from the first cell 19 to the second cell 21, the link 28 to the source base station 10 is dropped and a new link is formed with the target base station 11.

Figure 3:
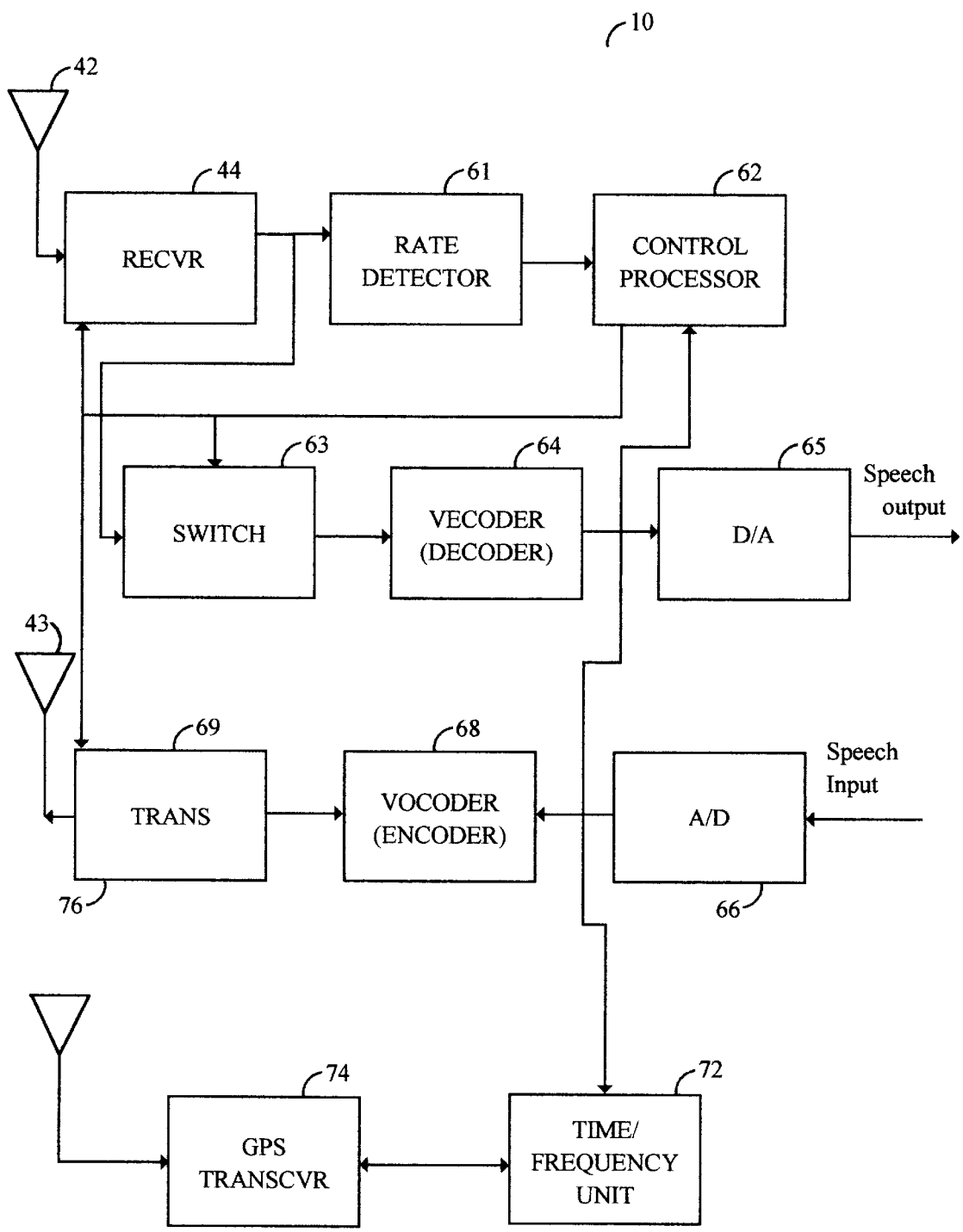
FIG. 3 is an illustrative simplified representation of a base station constructed in accordance with the teachings of the present invention.

FIG. 3 is an illustrative simplified representation of a base station 10 constructed in accordance with the teachings of the present invention. In accordance with the embodiment shown in FIG. 3, the base station 10 is essentially conventional. In an alternative embodiment, the base station 10 includes additional functionality which allows the base station to determine the position of a wireless unit 20, as will become clear from the description provided below. A conventional base station 10 includes a receive CDMA antenna 42 for receiving CDMA signals and a transmit CDMA antenna for transmitting CDMA signals. Signals received by the antenna 42 are routed to a receiver 44. In practice, the receiver 44 includes demodulators, deinterleavers, decoders and other circuits as will be appreciated by those skilled in the art. The received signal is allocated to an appropriate channel for which a rate detector 60 is associated. A control processor 62 uses the rate of the detected signal to detect speech. If speech is detected in a received frame, the control processor 62 switches the received frame to a vocoder 64 via a switch 63. The vocoder 64 decodes the variable rate encoded signal and provides a digitized output signal in response thereto. The digitized devocoded signal is converted to speech by a digital-to-analog converter 65 and an output device such as a speaker (not shown).

Input speech from a microphone or other input device (not shown) is digitized by an analog-to-digital converter 66 and vocoded by a vocoder encoder 68. The vocoded speech is input to a transmitter 69. In practice, the transmitter 69 includes modulators, interleavers and encoders as will be appreciated by those skilled in the art. The output of the transmitter 69 is fed to the transmit antenna 43.

Conventional base station 10 is also equipped with a GPS antenna 76, receiver 74 and timing and frequency unit 72. The timing and frequency unit accepts signals from the GPS engine of the GPS receiver and uses them to generate timing and frequency references for the proper operation of the CDMA system. Accordingly, in many such CDMA systems, each cell site uses a GPS time base reference from which all time critical CDMA transmissions (including pilot sequences, frames and Walsh functions) are derived. Such conventional timing and frequency units and GPS engines are common in CDMA systems and are well known in the art. Conventional timing and frequency units provide frequency pulses and timing information. In contrast, the timing and frequency unit 72 of the present invention preferably also outputs the elevation angle, pseudo range, satellite identification (i.e., pseudo noise (PN) offset associated with each satellite) and the Doppler shift associated with each satellite in order to assist the wireless unit 20 in acquiring the satellites (i.e., decrease the amount of time required to acquire a satellite). This information is typically available within conventional timing and frequency units, but is typically neither needed nor provided to external devices. The additional information provided by the timing and frequency unit 72 is preferably communicated to the BSC 14 in the same manner as is conventionally done with regard to frequency and timing information in a conventional base station.

Figure 4:
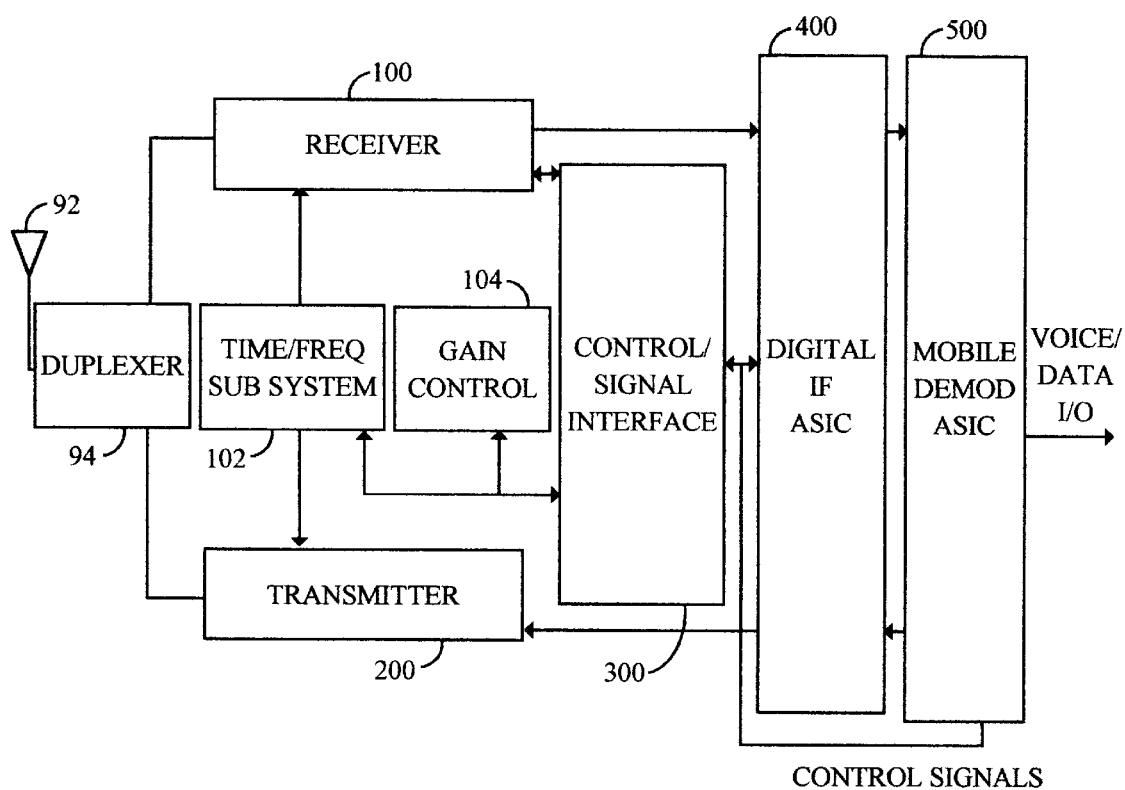
FIG. 4 is a block diagram of the wireless unit of the system for determining the position of a wireless CDMA transceiver of the present invention.

FIG. 4 is a block diagram of the wireless unit 20 in accordance with one embodiment of the present invention. The wireless unit 20 preferably includes a bidirectional antenna 92 adapted to receive CDMA transmissions well as GPS signals. In an alternative embodiment of the present invention, separate antennas may be used for receiving and transmitting GPS signals, CDMA signals, and other signals, such as alternative system signals. The antenna 92 preferably feeds a duplexer 94. The duplexer 94 preferably feeds a receiver 100 and is preferably fed by a transmitter 200. A time frequency subsystem 102 provides analog and digital reference signals for the receiver 100, a control signal interface 300, and the transmitter 200, as will be appreciated by those skilled in the art. CDMA power control is provided by a gain control circuit 104. In one embodiment of the present invention, the control signal interface 300 is a digital signal processor (DSP). Alternatively, the control signal interface may be another circuit capable of performing gain control functions. The control signal interface 300 provides control signals for the wireless unit 20. The receiver 100 provides for radio frequency (RF) down conversion and a first stage of intermediate frequency (IF) down conversion. A digital IF application specific integrated circuit (ASIC) 400 provides for a second stage of IF to baseband down conversion, sampling and A/D conversion. A mobile demodulator ASIC 500 searches and correlates digital baseband data from the digital IF ASIC 400 to ascertain pseudo-ranges as discussed more fully below.

The pseudo-ranges, along with any voice or data, is passed by the mobile demodulator 500 to the digital IF modulator 400. The digital IF modulator 400 provides a first stage IF up conversion of the data received from the mobile demodulator 500. A second stage of IF up conversion and RF up conversion of these signals is provided by the transmitter circuit 200. These signals are then transmitted to the base station 10 and processed in accordance with the method of the invention discussed below. It should be noted that location information to be communicated between the wireless unit 20 and the BSC 14, such as pseudo-ranges received by the wireless unit 20, are preferably communicated by the wireless unit 20 to the base station 10 via a data burst type message, such as short message service (SMS) defined by industry standard TIA/EIA/IS-167, published by the Telephone Industry Association. Such messages are transmitted through the base station 10 to the BSC 14. Alternatively, a newly defined burst type message could be transmitted by the wireless unit 20 to the base station 10.

Figure 5:
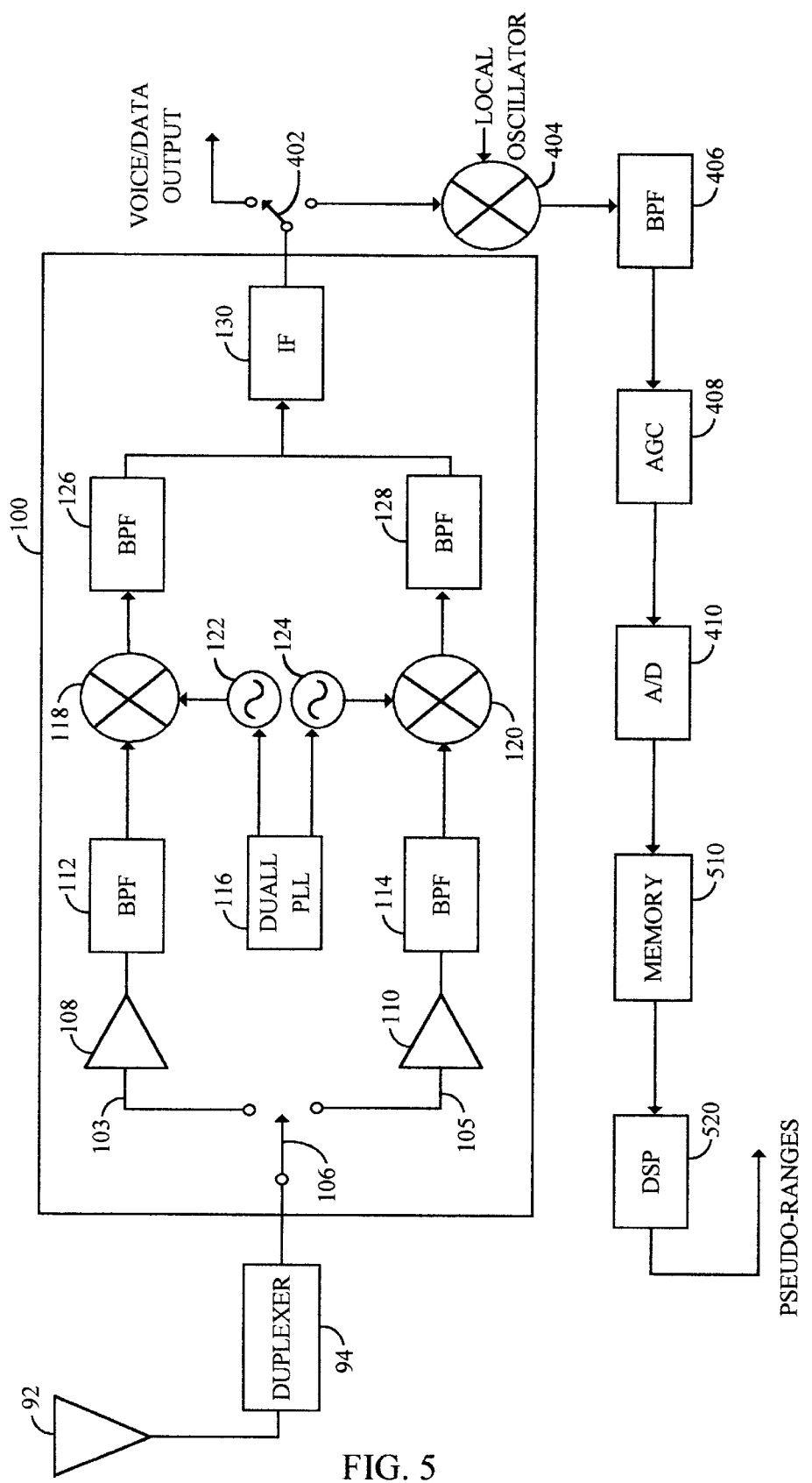
FIG. 5 is a block diagram of an illustrative implementation of a portion of the receiver, control signal interface, digital IF, and wireless demodulator circuits of the wireless unit of the present invention.

FIG. 5 is a block diagram of an illustrative implementation of a portion of the receiver, control signal interface, digital IF, and mobile demodulator circuits of the wireless unit 20 of the present invention. The transmitter portion of the wireless unit 20 is essentially identical to the transmitter portion of a conventional wireless unit and therefore is not discussed herein for the sake of brevity. In the preferred embodiment, the receiver 100 is implemented with first and second paths 103 and 105, respectively, which are connected to the antenna 92 via the duplexer 94 via a first switch 106. It will be understood by those skilled in the art that more integration between the two-way communication device and the GPS receiver could take place. Alternatively, two separate receivers with an appropriate interface could achieve the objective of the present invention.

The first path 103 downconverts received CDMA signals and provides conventional CDMA RF downconverted output signals. The first path 103 includes a low noise amplifier 108, a first bandpass filter 112, a first mixer 118 and a second bandpass filter 126. The second path 105 downconverts GPS signals from the GPS satellites 60, 70, 80 or 90 of FIG. 1. The second path 105 includes a second low noise amplifier 110 which feeds a third bandpass filter 114. The output of the bandpass filter 114 is input to a second mixer 120. The output of the second mixer is fed to a fourth bandpass filter 128. The first and second mixers are fed by first and second local oscillators 122 and 124, respectively. The first and second local oscillators 122 and 124 operate at different frequencies under control of a dual phase locked loop (PLL) 116. The dual PLL insures that each local oscillator 122 and 124 maintains a reference frequency effective to down convert either a received CDMA signal, in the case of the first mixer 118, or a received GPS signal, in the case of the second mixer 120. The outputs of the second and fourth bandpass filters 126 and 128 are coupled to a first IF section 130 of conventional design.

The output of the IF demodulator 130 is input to a second switch 402 in the digital IF ASIC 400. The first and second switches 106 and 402 operate under control of the control signal interface 300 to divert a received signal for voice or data output processing in a conventional CDMA manner or GPS processing by a third mixer 404, fifth bandpass filter 406, an automatic gain control circuit 408 and an analog to digital converter 410. The second input to the third mixer 404 is a local oscillator output. The mixer 404 converts the applied signal to baseband. The filtered, gain controlled, signal is fed to an analog-to-digital converter ("A/D") 410. The output of the A/D 410 includes a first digital stream of in-phase (I) components and a second digital stream of quadrature components (Q). These digitized signals are fed to a digital signal processor 520, which processes the GPS signal and outputs the pseudo-range information required for position determination.

In an alternative embodiment of the present invention, the outputs from the two bandpass filters 126, 128 are fed to a baseband application specific integrated circuit (ASIC) which digitally converts the IF frequency signals output from the baseband filters 126, 128 to baseband and outputs a stream of digital values that represent the quadrature and in-phase baseband signals. These signals are then applied to a searcher. The searcher is essentially identical to conventional searches used in CDMA demodulators. However, the searcher that is preferably used is programmable to allow the searcher to search for either a PN code associated with the CDMA signals transmitted from the base station or the PN code associated with the GPS satellites. The searcher discriminates between CDMA channels when receiving CDMA signals from the base station and determines the GPS satellite from which received GPS signals are being transmitted when in the GPS mode. In addition, once the GPS signals are acquired, the searcher indicates the time offset associated with the PN code essentially in a conventional manner in order to determine the pseudo range associated with satellites from which signals are being received, as will be understood by those skilled in the art.

It will be understood by those skilled in the art that a double conversion process, such as is shown in FIG. 5, or alternatively, a single conversion and IF sampling technique, could be used to produce the required I and Q samples. Furthermore, the structure of the embodiment shown in FIG. 5 may be altered in many ways that would not affect the operation of the present invention. For example, a conventional programmable processor may be used in place of the DSP that is shown in FIG. 5. The memory 510 may not be required if the rate at which data flows through the system is such that no buffers are required. The bandpass filter 406 and automatic gain control circuit 408 may be omitted under certain conditions, implemented using digital techniques or analog techniques, or other wise altered. Many other such variations to the structure that is shown in FIG. 5 may be made without altering the invention. Furthermore, it should be noted that an alternative embodiment may have greater or lesser sharing of hardware and software resources between the GPS and wireless receiver.

Figure 6:
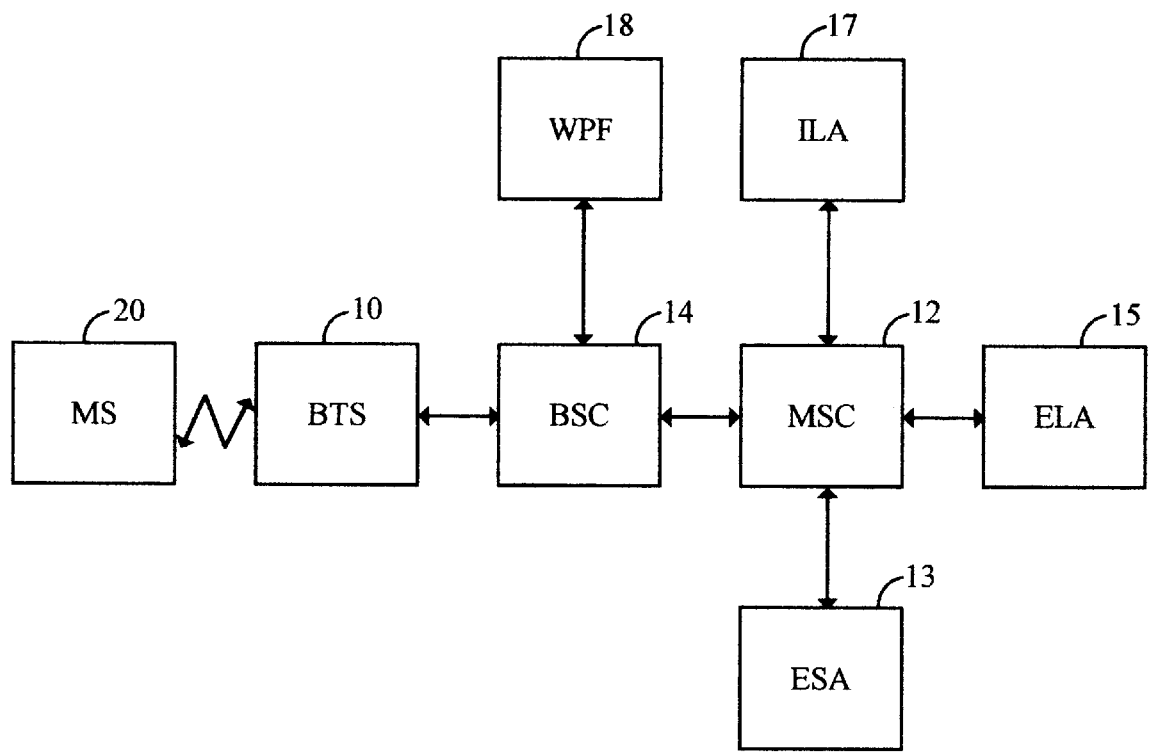
FIG. 6 is an illustration of a functional model for determining the location of a wireless unit.

FIG. 6 is a high level block diagram of the components of a communication system which includes the present invention. In operation, in accordance with the inventive method, the BSC 14 requests GPS information from the control processor 62 (FIG. 3) within the base station 10. This information includes, but is not limited to, all of the satellites currently being viewed by the GPS transceiver 74 (FIG. 3), their elevation angle, Doppler shift, and pseudo ranges at a specific time. Note that the GPS receiver at the base station 10 has up-to-date information on the location, frequency, and PN offset of each satellite in view, because it is always tracking all satellites that are in view. Alternatively, the base station 10 could send data corresponding to a subset of only those satellites that can be viewed by the wireless unit 20, assuming that the base station 10 has stored information regarding the street width and height of the surrounding buildings. That is, if the base station 10 has the ability to determine that the wireless unit will have an obstructed view of one or more satellites, then the base station 10 will not send information regarding those satellites that are obstructed.

It should be noted that a conventional GPS receiver notes the time at which satellite signals are received with respect to the receiver's internal GPS clock. However, the receiver's internal GPS clock is not accurately synchronized to "true" GPS time. Therefore, the receiver cannot know the exact point in "true" GPS time at which the satellite signals are received. Later, a navigation algorithm corrects this error by using a fourth satellite. That is, if the clock within the receiver were accurately synchronized to the clock in each satellite, then a conventional GPS receiver would only require three satellites to accurately determine the position of the receiver. However, since the receiver clock is not accurately synchronized to the satellite's clock, additional information is required. This additional information is provided by noting the time at which a fourth satellite's signal is received by the receiver. This can be understood by noting that there are four equations (i.e., one equation associated with each of the four satellites) and four unknowns which must be solved (i.e., the x, y, and z coordinates of the receiver, and the error in the receiver clock). Therefore, for three-dimensional solutions, at least four measurements from four different satellites are required in a conventional GPS receiver.

In contrast, the present system utilizes a earth based station which is synchronized to true GPS time. In one embodiment, this station is a CDMA base station. It will be understood by those skilled in the art that CDMA base stations are synchronized to GPS time. In addition, all wireless units that communicate through such CDMA base stations using the CDMA protocol are also synchronized to an offset GPS time which is unique to each wireless unit 20. The offset in time is equal to the one-way delay caused by the propagation of the radio signal from the base station antenna to the wireless unit antenna. This is due to the fact that the wireless unit synchronizes its clock by receiving an indication from the base station of the GPS time. However, by the time the indication arrives at the wireless unit, the indication is in error by an amount equal to the propagation delay encountered while the signal travels from the base station to the wireless unit. This propagation delay can be determined by measuring how long it takes a signal to make a round-trip between the base station and the wireless unit. The one way delay will be equal to half the round trip delay. Many ways for measuring the round trip delay are available to those skilled in the art.

In addition, the distance between the base station 10 and the wireless unit 20 can be used to assist in determining the location of the wireless unit 20. Hence, in the case of direct line-of-sight (LOS) between the base station 10 and the wireless unit 20, one needs only two satellite range measurements and one base station range measurement. In cases where there is no direct LOS between the serving base station and the wireless unit, three satellite measurements and one round trip delay measurement are required to calculate a three-dimensional location. The extra satellite measurement is required to correct for the additional distance introduced by the additional delay caused by the multipath. The round trip delay is used to correct the clock error in the wireless unit.

The system described herein allows the position of a valid CDMA wireless unit to be determined at any time utilizing a Wireless Positioning Function (WPF) 18 (FIG. 6), as long as the wireless unit 20 is within the radio coverage area of the CDMA network and as long as there is sufficient quality of service on the CDMA network. The process of determining the position of a wireless unit may be initiated by the wireless unit 20, the network, or an external entity, such as an internal location application (ILA) 17, an external location application (ELA) 15, or an emergency service application (ESA) 13. Each of these components 13, 15, 17 may be either hardware or software which is capable of requesting and/or receiving location information. In one embodiment, the ILA 17 is a terminal coupled to the BSC 14 which allows an operator to directly request and receive location information regarding a wireless unit 20. Alternatively, the ILA 17 is a software application executed by a processor within the MSC 12.

The WPF 18 is preferably a conventional programmable processor capable of accepting the raw data that is received from the wireless unit and from the satellites (i.e., the pseudo ranges from two satellites, the distance from the wireless unit to the base station and the time correction factor) and calculating the position of the wireless unit. However, any device that is capable of receiving the information required to calculate the location of the wireless unit 20 based on such received information and output this location determination may be used. For example, the WPF 18 may be implemented as an ASIC, a discrete logic circuit, a state machine, or a software application within another network device (such as the BSC 14). Furthermore, it should be understood that the WPF 18 may be located within the base station 10, the BSM 14, or elsewhere in the MSC 12. Preferably, the WPF 18 is a software application that is either executed by a dedicated processor that is in communication with the BSC 14. Accordingly, the base station 10, the BSC 14, and the MSC 12 need not be significantly modified in order to implement the present invention with conventional components. Alternatively, the WPF 18 is a software application that is executed by a processor within the BSC 14. The WPF 18 preferably communicates with the BSC 14 via a communication port similar to that used by conventional billing functions, management functions, home location register/visitor location register functions, and other ancillary functions that are performed by processors that are coupled to conventional BSCs.

The algorithm used to calculate the position is provided in Parkinson, B. W., and Spilker, J. J., Editors, Global Positioning System: Theory and Applications, Volume. I, American Institute of Aeronautics and Astronautics Inc., Washington D.C., 1996. Additionally, it should be noted that Volume II teaches how to perform differential GPS correction. It will be understood by those skilled in the art that such correction may have to be performed by the WPF 18 in order to calculate the position of the wireless unit accurately.

In accordance with one embodiment of the present invention, a service provider can restrict positioning services based on several conditions, such as capability, security, service profiles, etc. Location services may support each, or some subset, of the following services:

(1) Wireless unit originated request for positioning (WPF).

(2) Network originated request for positioning (NRP).

(3) Positioning allowed on a per service instance (PSI): The wireless unit gives an external application a temporary allowance to position the unit for the purpose of delivering a specific service.

(4) Positioning with/without wireless unit identification (PWI/PWO): will position all wireless units in a defined geographical area. PWI will give the identity and the location of these units while PWO will only give their location.

(5) Positioning within a closed group (PCG): Allows for the creation of groups within which special rights for positioning can be determined (fleet management).

TABLE 1

Type of location services

| Initiator/ Periodicity | On demand (single/multiple instances) | Periodically | Event trigger |
|---|---|---|---|
| Wireless unit | WPF, PSI, PCG | WPF, PCG | WPF |
| Network | PWO | PWO | NRP/PWO |
| External | PWO, PWI, PCG, PSI | PWO, PWI, PCG | |

Figure 7:
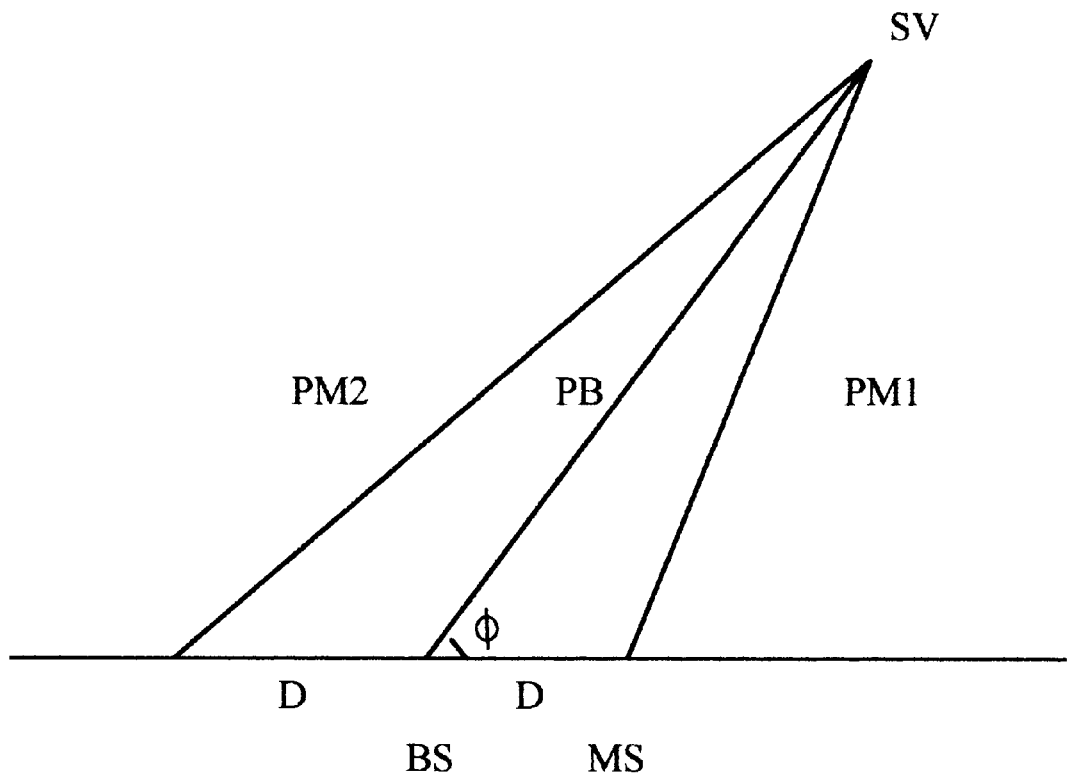
FIG. 7 shows the calculations of the search window size and center in the time domain.

In accordance with one embodiment of the present invention in which a wireless unit 20 originates a request for the position of that wireless unit 20 to be determined, the wireless unit 20 sends a position request to the MSC 12. The MSC 12 validates the request to ensure that the wireless unit 20 has subscribed to the type of service requested. The MSC 12 then sends a request to the serving BSC 14 to find the position of the wireless unit 20. The BSC 14 asks the serving base station 10 for position aiding information. The serving base station 20 responds to the request by sending a list of satellites in view, their Doppler shift, their rate of Doppler change, their pseudo-ranges, their elevation angles, their Signal-to-Noise ratio (SNR), and the Round Trip Delay (RTD) between the wireless unit and the serving base station. Note that the GPS receiver 74 within the base station 10 is continuously tracking the satellites in view and hence can have up-to-date information on these parameters. The BSC 14 will use the RTD, pseudo-range, satellite elevation angle, Doppler shift and rate of change of Doppler for each satellite to calculate the search window center and search window size in both time and frequency as follows (see also FIG. 7):

In the time domain the center of the search window for the $i^{th}$ space vehicle ("$SV_i$") is equal to the pseudo-range between the serving base station 10 and the $SV_i$, $\rho b$ in FIG. 7. The search window size for $SV_i$ is equal to the round trip delay times the cos ($\phi i$), where cos ($\phi i$) is the cosine of the angle of the elevation of the satellite with respect to the radius of the earth which originates at the center of the earth and passes through the receiver.

In frequency domain, the center of the search window center for $SV_i$ is equal to $f_o + f_{di}$; where $f_o$ is equal to the carrier frequency of the GPS signal and $f_{di}$ is equal to the Doppler shift of the signal transmitted by $SV_i$. The search window size for $SV_i$ is equal to the uncertainty in frequency due to receiver frequency error and Doppler rate of change. The BSC 14 sends the information including satellites in view, searcher window centers, sizes, in both time and frequency, and the minimum number of satellites needed to determine the position of the wireless unit 20.

In accordance with one embodiment, a message to the wireless unit 20 will trigger a returning signal at the wireless unit 20. The message also could have an "action time" (a particular time in the future when the receiver will retune to a GPS receiver frequency). In response, the wireless unit 20 will activate the first and second switches 106 and 402 at the action time (FIG. 5) and thereby retune itself to the GPS frequency. The digital IF ASIC 400 changes its PN generator (not shown) to GPS mode and starts to search all specified satellites.

Once the wireless unit 20 acquires the minimum number of the required satellites, it computes the pseudo-ranges based on the GPS clock within the wireless unit 20, re-tunes to the communication system frequency, and sends the pseudo-range results along with the measured signal-to-noise ratio of the first three satellites and a most recent CDMA pilot search result to the BSC 14. The pilots search results are needed if the unit cannot acquire three satellites and there is no direct line of sight path between the serving base station and the wireless unit 20. Nonetheless, less than three satellites can be used, as long the round trip delay from another device, such as another base station, can be computed using available information, such as pilots search information. Techniques for determining round trip delay based on pilot search information are well known in the art.

Figure 8:
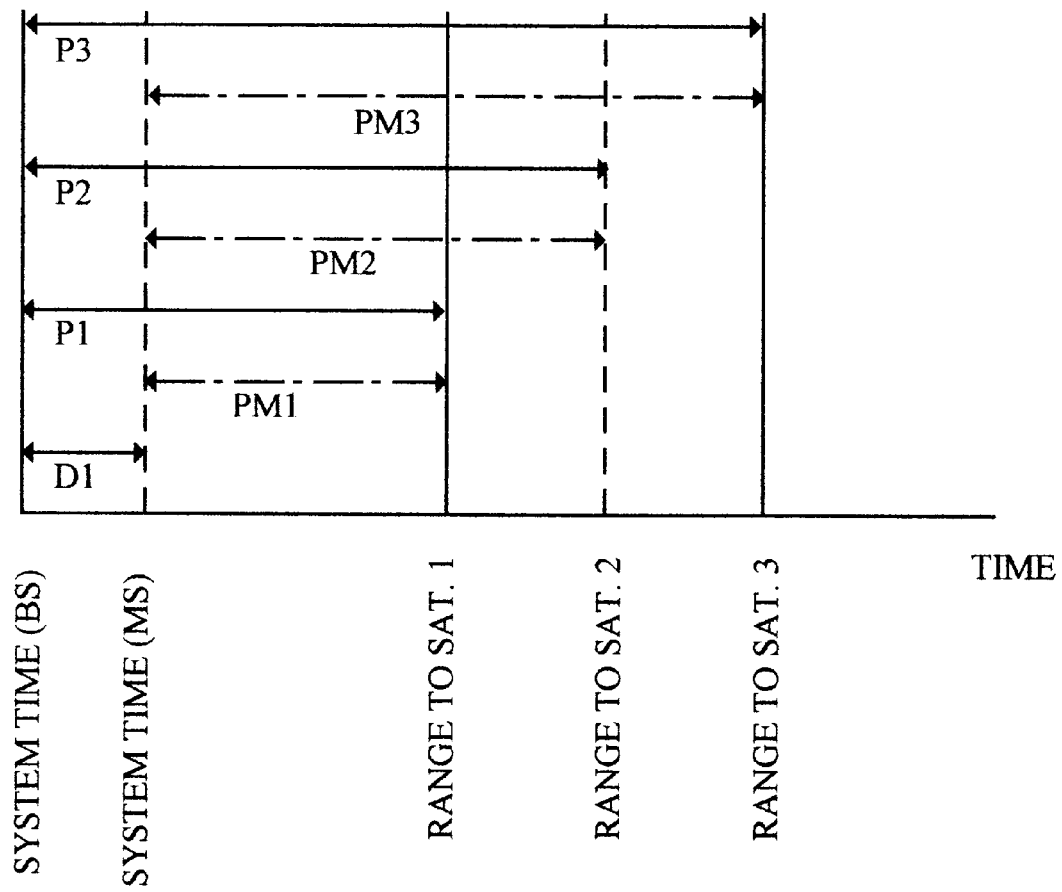
FIG. 8 is a diagram which illustates correction of the local clock bias.

The BSC 14 sends the pseudo-range measurements made by the wireless unit 20, together with the position of the serving base station 10, the corresponding round trip delay measurements, the position (in space) of the satellites under consideration (with reference to a fixed, predetermined reference origin), and differential GPS correction to the WPF 18 where the position of the wireless unit 20 is calculated. The pseudo-ranges received from the wireless unit 20 by the BSC 14 and passed to the WPF 18 are relative to the clock within the wireless unit 20. Therefore, they are erroneous (i.e., biased by the round trip delay between the serving BTS 10 and the wireless unit 20). FIG. 8 is a diagram which illustrates how the WPF 18 corrects for the local clock bias. In FIG. 8, $\delta 1$ represents the pseudo-range (half the round trip delay) in the receipt of signals transmitted from the base station 10 to the wireless unit 20 and vice versa, rm1, rm2 and rm3 are the pseudo-ranges from the wireless unit to the first, second and third selected GPS satellites 60, 70 and 80, respectively. These measurements are taken with respect to the local clock in the wireless unit 20. But since the local clock is offset from the true GPS time by $\delta 1$, the corrected pseudo-ranges are then:

$\rho 1 = \rho m1 + \delta 1$
$\rho 2 = \rho m2 + \delta 1$
$\rho 3 = \rho m3 + \delta 1$ The WPF 18 uses the above three equation, position (in space) of the three satellites, position of the severing base station, and corresponding RTD measurements to calculate the position of the wireless unit 20. Note that knowing the RTD is equivalent to exactly knowing the local clock bias of the wireless unit relative to the true GPS time. That is, it is sufficient to solve the three range equations from the three satellites.

Note also that the minimum number of satellites required can be reduced to two if there is a direct line of sight connection between the wireless unit 20 and a base station 10, such that the distance between the wireless unit 20 and the base station 10 can be determined directly from the RTD between the wireless unit 20 and the base station 10. This number can be further reduced if information about other pilots (sites) are available. For example, if the wireless unit 20 is in communication with two or more base stations (e.g., soft handoff), neither of which have a direct line of site to the wireless unit 20, more than one round trip delay may be calculated, and hence two satellites are all that is needed to determine the position of the wireless unit 20. That is, the calculations can be made based on the five equations (two equations related to the two pseudo range measurements associated with the two satellites, two equations related to the two base station RTD measurements, and one equation related to the RTD to the serving base station that allows the local clock within the wireless unit 20 to be synchronized to true GPS time). This is very useful in scenarios where GPS satellites are blocked or shadowed by buildings of trees. In addition, it reduces the time to search for GPS satellites. The WPF 18 sends the calculated position to BSC 14 which forwards it to MSC 12 or sends it directly to the wireless unit 20.

The present invention has been described herein with reference to a particular embodiment for a particular application. Those having ordinary skill in the art and access to the present teachings will recognize additional modifications applications and embodiments within the scope thereof. It is therefore intended by the appended claims to cover any and all such applications, modifications and embodiments within the scope of the present invention.

What is claimed is:

1. A system for determining a position of a mobile wireless transceiver comprising:
   a base station;
   means for calculating a Doppler shift of signals transmitted from first, second and third satellites, respectively, relative to the base station;
   means for calculating a first set of pseudo ranges of the first and second satellites, respectively, relative to said base station;
   means for sending satellite identification information, Doppler shift information, and said pseudo range information between said base station and said wireless transceiver;
   means disposed at said wireless transceiver for receiving said satellite identification information, Doppler shift information, and said pseudo range information from said base station;
   means disposed at said mobile wireless transceiver for utilizing said information received from said base station to identify a second set of pseudo ranges between said transceiver and said first and second satellites, respectively, at a time T;
   means disposed at said mobile wireless transceiver for sending to said base station said second set of pseudo ranges between said transceiver and said first and second satellites, respectively, along with time information for the time T; and
   means disposed at the base station for calculating the position of said wireless transceiver in response to said second set of pseudo ranges and said time information for the time T.

2. The invention of claim, 1 wherein said means disposed at the base station for calculating the position of said wireless transceiver in response to said second set of pseudo ranges and said time information for the time T includes means for determining the distance of said wireless transceiver from said base station.

3. The invention of claim 2 wherein said means disposed at the base station for calculating the position of said wireless transceiver includes means for utilizing the distance of said wireless transceiver from said base station in the calculation of the position of said wireless transceiver.

4. The invention of claim 1 including means disposed at the base station for identifying two optimal positioning satellites.

5. The invention of claim 1 including means for switching said mobile wireless transceiver from a first mode for effecting voice/data communication to a second mode for locating the position thereof.

6. The invention of claim 1 wherein said means disposed at the base station for calculating the position of said wireless transceiver includes:
   means for utilizing said second set of pseudo ranges to calculate a third set of pseudo ranges between said first and second satellites and said base station, respectively and
   means for utilizing known positions of the two satellites at time T, the position of the base station, the third set of pseudo ranges and a delay in the time of arrival of a signal transmitted from the mobile wireless transceiver to the base station to ascertain the position of said wireless transceiver.

7. The invention of claim 6 wherein said means for calculating the position of the wireless transceiver includes means for finding an intersection of a first sphere of first radii around a first of the two satellites, a second sphere of second radii around a second of the two satellites, and a third sphere of third radii around said base station.

8. The invention of claim 1 wherein said means for calculating the position of the wireless transceiver includes means for finding an intersection of a first sphere of first radii around a first of the two satellites, a second sphere of second radii around a second of the two satellites, and a third sphere of third radii around said base station.

9. A system for determining a position of a mobile wireless transceiver comprising:
   a base station;
   means disposed at the base station for identifying first and second Global Positioning System satellites;
   means for calculating a Doppler shift of signals transmitted from said first and second satellites, respectively, relative to the base station;
   means for calculating a first set of pseudo ranges of the first and second satellites, respectively, relative to said base station;
   means for sending satellite identification information, Doppler shift information, and said pseudo-range information from said base station to said wireless transceiver;
   means disposed at said wireless transceiver for receiving said satellite identification information, Doppler shift information, and said pseudo range information from said base station;
   means disposed at said mobile wireless transceiver for utilizing said information received from said base station to identify a second set of pseudo ranges between said transceiver and said first and second satellites, respectively, at a time T;
   means disposed at said mobile wireless transceiver for sending to said base station said second set of pseudo ranges between said transceiver and said first and second satellites, respectively, along with time information for the time T and
   means disposed at the base station for calculating the position of said wireless transceiver in response to said second set of pseudo ranges and said time information for the time T said means for calculating including:
      means for determining the distance of said wireless transceiver from said base station and
      means for utilizing the distance of said wireless transceiver from said base station in the calculation of the position of said wireless transceiver.

10. The invention of claim 9 including means for switching said mobile wireless transceiver from a first mode for effecting voice/data communication to a second mode for locating the position thereof.

11. The invention of claim 9 wherein said means disposed at the base station for calculating the position of said wireless transceiver includes:
   means for utilizing said second set of pseudo ranges to calculate a third set of pseudo ranges between said first and second satellites and said base station, respectively and means for utilizing known positions of the first and second satellites at time T the position of the base station, the third set of pseudo ranges and a delay in the time of arrival of a signal transmitted from the mobile wireless transceiver to the base station to ascertain the position of said wireless transceiver.

12. The invention of claim 11 wherein said means for calculating the position of the wireless transceiver includes means for finding an intersection of a first sphere of radii around a first of the two satellites, a second sphere of second radii around a second of the two satellites, and a third sphere of third radii around said base station.

13. The invention of claim 9 wherein said means for calculating the position of the wireless transceiver includes means for finding an intersection of a first sphere of first radii around a first of the two satellites, a second sphere of second radii around a second of the two satellites, and a third sphere of third radii around said base station.

14. A method for determining a position of a mobile wireless transceiver including the steps of:

calculating Doppler shift of signals transmitted from first and second satellites, respectively, relative to a base station;

calculating a first set of pseudo ranges of the first and second satellites, respectively, relative to said base station;

sending satellite identification information, Doppler shift information, and said pseudo-range information from said base station to said wireless transceiver;

receiving, at said transceiver, said satellite identification information, Doppler shift information, and said pseudo range information from said base station;

utilizing said information received from said base station to identify a second set of pseudo ranges between said transceiver and said first and second satellites, respectively, at a time T;

sending to said base station said second set of pseudo ranges between said transceiver and said first and second satellites, respectively, along with time information for the time T; and calculating the position of said wireless transceiver in response to said second set of pseudo ranges$_{4,5}$ and said time information $t_x$.

15. The invention of claim 14 wherein said step of calculating the position of said wireless transceiver in response to said second set of pseudo ranges and said time information for the time T includes the step of determining the distance of said wireless transceiver from said base station.

16. The invention of claim 15 wherein said step of calculating the position of said wireless transceiver includes the step of utilizing the distance between said wireless transceiver and said base station in the calculation of the position of said wireless transceiver.

17. The invention of claim 14 including the step of identifying two optimal positioning satellites.

18. The invention of claim 14 including the step of switching said mobile wireless transceiver from a first mode for effecting voice/data communication to a second mode for locating the position thereof.

19. The invention of claim 14 wherein said step of calculating the position of said wireless transceiver includes the steps of:

utilizing said second set of pseudo ranges to calculate a third set of pseudo ranges between said first and second satellites and said base station, respectively and utilizing known positions of the two satellites at time T the position of the base station, the third set of pseudo ranges and a delay in the time of arrival of a signal transmitted from the mobile wireless transceiver to the base station to ascertain the position of said wireless transceiver.

20. The invention of claim 19 wherein said step of calculating the position of the wireless transceiver includes the step of finding an intersection of a first sphere of first radii around a first of the two satellites, a second sphere of second radii around a second of the two satellites, and a third sphere of third radii around said base station.

21. The invention of claim 14 wherein said step of calculating the position of the wireless transceiver includes the step of finding an intersection of a first sphere of first radii around a first of the two satellites, a second sphere of second radii around a second of the two satellites, and a third sphere of third radii around said base station.

* * * * *